Patented Mar. 1, 1949

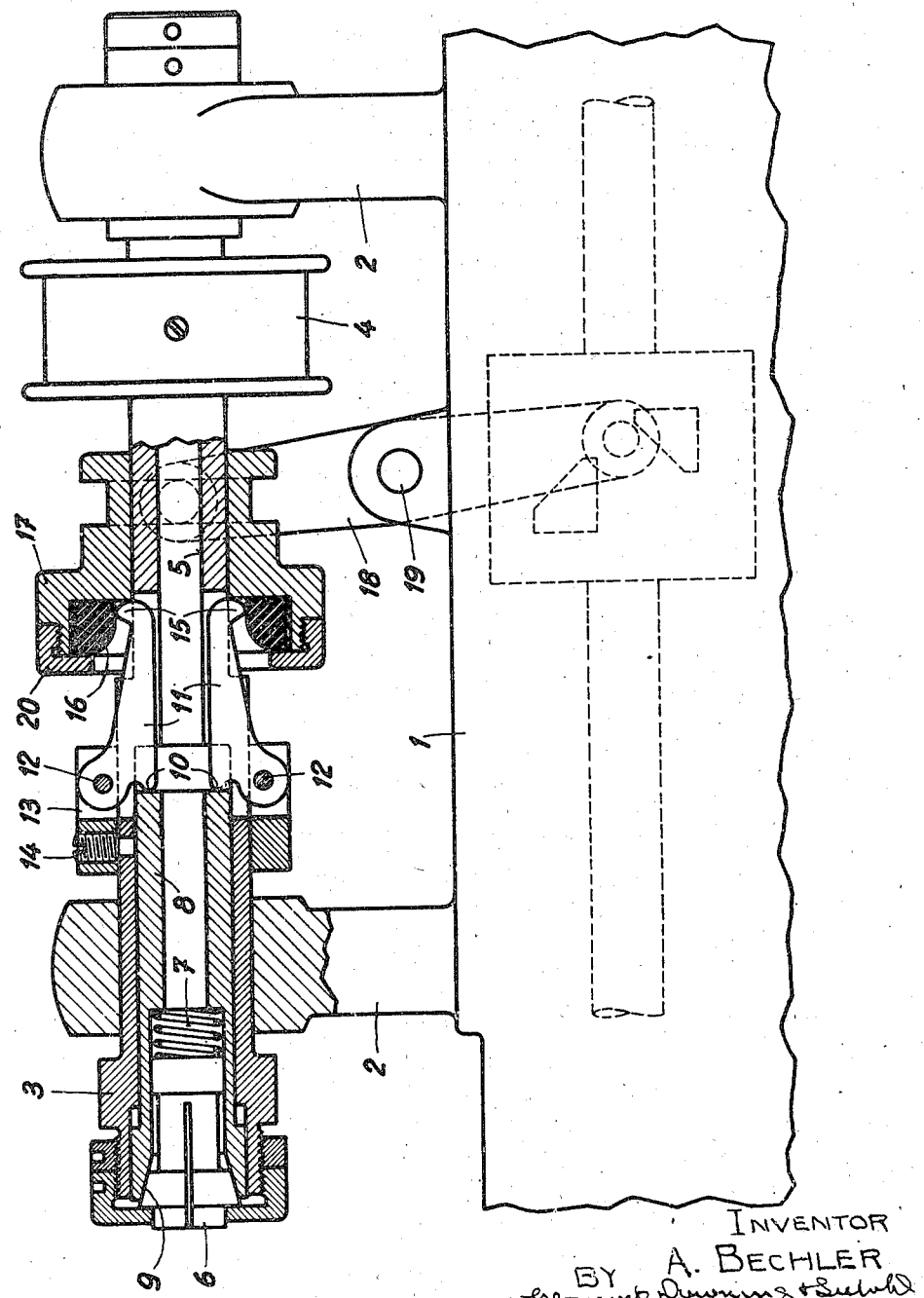

2,462,936

UNITED STATES PATENT OFFICE 2,462,936

GRIPPING DEVICE FOR THE BAR IN TURRET LATHES

André Bechler, Moutier, Switzerland

Application May 8, 1946, Serial No. 668,036
In Switzerland March 12, 1946

3 Claims. (Cl. 279—1)

In the greater majority of automatic lathes, the work is done on the end of a bar projecting from the hollow spindle of the head-stock. This bar being made solid with the latter by means of a cone-collet. The clamping of the collet is effected by means of pawls pivoted in the spindle, which can be acted upon by a disconnecting lever pivoted on the machine. The thrust on the pawls in the operation is enormous and the tail ends of these pawls undergo a pressure of some hundred kilos. It is therefore extremely important for this pressure to be equally distributed over the different pawls.

The gripping device of the kind described above, according to the present invention, is characterised by the fact that the clamping ring of the pawls is lodged in a sleeve which carries it along the spindle in the direction of the work, but having the characteristic of being able to adapt itself radially to the possible irregular positions of the tail-ends of the pawls.

Preferably, the ring in question should be made in springy material so that after a period of running of the machine, certain differences may be compensated for.

The attached drawing shows, by way of example, and in longitudinal section, a gripping device for the bar in turret lathes according to the present invention. The bed of the head-stock is denoted by 1, it carries bearings 2 in which the spindle 3 rotates. This spindle is hollow at 5 to take the bar to be worked. This bar is made solid with the hollow spindle by means of a cone-collet 6 which can be inserted in the hollow seat 7 in the tube 8, the one extremity of which is beveled at 9 to correspond to the angle of the cone-collet. In reach of the other end of the tube 8, diametrical slots are milled in the spindle 3, into which the jaws 10 of the pawls 11, pivoted at 12 on the collar which is solidly fixed on to the spindle by means of a screw 14, penetrate.

The tail ends 15 of the pawls are placed so as to be reached by the ring 16 in springy material such as steel for example, lodged in a sleeve 17 which can be slipped along the spindle by means of a lever 18 pivoted at 19 the other end of which is connected directly to the camshaft.

The ring 16 is adjusted within the sleeve 17 and the ring 20 in such a manner that it will always be carried along the spindle, but with sufficient radial play with regard to the sleeve 17 permitting it to give slightly way radially on the occasion of an irregular position of the tail ends 15 with regard to the axis of the ring 16.

The shape of the mouth of the ring is such that, with the aid of the rotative action, all the pawls are acted upon equally by the movement conveyed to them by the lever 18. In this way all the jaws 10 of the pawls 11 will push with the same force on to the end of the tube 8, in consequence each jaw of the cone-collet will grip with uniform intensity and the fatigue will be the same for all the parts in contact.

What I claim is:

1. In a gripping device for the stock in lathes, a rotatable spindle, a shiftable tube in said spindle comprising a conical head, a gripping collet with a cone cooperating with said conical head for gripping the stock, pivoted pawls in cooperation with said tube to contract said conical head, a lever-operated control-means displaceable along the axis of the spindle, having a bearing hole within reach of the free ends of said pawls, and a ring for swinging the pawls to contract said gripping collet, contained in said bearing hole in a manner to be carried along on a displacement of said control means, but to have radial play with regard to said control-means to give radially way on the occasion of a possible irregular position of said pawls with regard to the axis of said ring.

2. In a gripping device according to claim 1, said control-means comprising a sleeve and a cover-ring screwed to said sleeve, said sleeve and said cover-ring forming together said bearing hole.

3. In a gripping device according to claim 1, said ring being made of springy material.

ANDRÉ BECHLER.

REFERENCES CITED

The following references are of record in the file of this patent:

UNITED STATES PATENTS

| Number | Name | Date |
| --- | --- | --- |
| 1,413,161 | Head et al. | Apr. 18, 1922 |
| 1,479,550 | Kristek | Jan. 1, 1924 |
| 1,818,305 | Glass | Aug. 11, 1931 |

FOREIGN PATENTS

| Number | Country | Date |
| --- | --- | --- |
| 508,171 | France | 1920 |
| 344,654 | Great Britain | 1931 |
| 550,343 | Great Britain | 1943 |